(12) United States Patent
Beyer

(10) Patent No.: US 6,546,638 B2
(45) Date of Patent: Apr. 15, 2003

(54) SELF-ILLUMINATED ATTITUDE INDICATOR AND METHOD FOR SELF-RESCUE FROM AVALANCHE

(76) Inventor: Joan M. Beyer, 12946 Kent-Kangley Rd., Suite 289, Kent, WA (US) 98031

(*) Notice: Subject to any disclaimer, the term of this patent is extended or adjusted under 35 U.S.C. 154(b) by 0 days.

(21) Appl. No.: 09/920,020

(22) Filed: Aug. 1, 2001

(65) Prior Publication Data

US 2002/0017029 A1 Feb. 14, 2002

Related U.S. Application Data

(60) Provisional application No. 60/222,063, filed on Aug. 1, 2000.

(51) Int. Cl.$^7$ .............................. G01C 9/32; G08B 1/00
(52) U.S. Cl. ............................ 33/348; 33/354; 33/379; 116/211
(58) Field of Search ................................ 33/348, 348.2, 33/365, 370, 373, 377, 379; 116/211, 215

(56) References Cited

U.S. PATENT DOCUMENTS

| | | | |
|---|---|---|---|
| 1,318,162 A | 10/1919 | Loring | |
| 1,839,661 A | 1/1932 | Ellison | |
| 2,205,733 A | 6/1940 | Sauter et al. | |
| 2,344,241 A | 3/1944 | Flint | |
| 2,646,628 A | * 7/1953 | Shaler | 33/379 |
| 2,810,821 A | * 10/1957 | Cohn | 33/348 |
| 2,877,555 A | 3/1959 | Visockis, Jr. | |
| 2,976,046 A | * 3/1961 | McCullough, Jr. | 33/379 |
| 3,041,917 A | 7/1962 | Glatt | |
| 3,673,697 A | 7/1972 | Wasson | |
| 3,871,109 A | * 3/1975 | Vaida | 33/379 |
| 4,079,521 A | 3/1978 | Uhorczak | |
| 4,392,184 A | 7/1983 | Hearold et al. | |
| 4,407,075 A | 10/1983 | MacDermott et al. | |
| 4,932,133 A | * 6/1990 | Bruhn | 33/377 |
| 5,007,368 A | * 4/1991 | Bush | 116/211 |
| 5,406,714 A | * 4/1995 | Baker et al. | 33/382 |

* cited by examiner

Primary Examiner—Diego Gutierrez
Assistant Examiner—Yaritza Guadalupe
(74) Attorney, Agent, or Firm—Christensen O'Connor Johnson Kindness PLLC

(57) ABSTRACT

A self-illuminating attitude indicator for use by persons who have been buried in snow or the earth. The attitude indicator has a container partially filled with liquid and a manually operated light to illuminate the container. The liquid may be removed from the container and distributed on the snow to make the location more visible to rescuers.

1 Claim, 3 Drawing Sheets

SELF-ILLUMINATED ATTITUDE INDICATOR AND METHOD FOR SELF-RESCUE FROM AVALANCHE

CROSS-REFERENCE TO RELATED APPLICATION

This application claims the benefit of U.S. Provisional Application No. 60/222,063, filed Aug. 1, 2000.

FIELD OF THE INVENTION

The invention relates to an apparatus and method for determining an individual's orientation with respect to the Earth when buried in snow or mud.

BACKGROUND OF THE INVENTION

At present, persons buried in the snow or elsewhere are frequently unable to determine the direction of the surface. Avalanche victims have been found after having dug through ten feet of snow parallel to the surface. Other victims have been found deceased after having obviously been conscious for several hours while buried. The only existing method for determining the direction of the surface is to expectorate saliva and try to determine which direction the saliva moves as a result of gravity.

SUMMARY OF THE INVENTION

The present invention provides a self-illuminated attitude indicator optimized for use by persons buried in snow or mud. A further feature of the invention is the method of using a small self-illuminating attitude indicator to determine the upward direction, thereby permitting the buried person to most quickly extricate themselves from the snow or mud. An optional feature of the present invention is the use of a liquid which also may be used as a dye marker in snow or ice.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
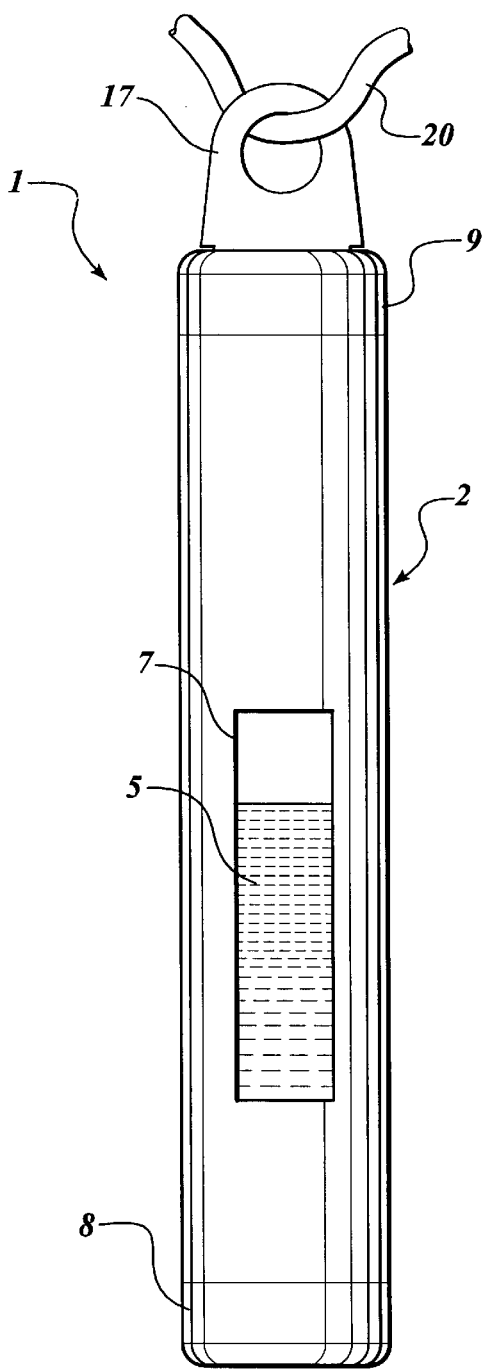
FIG. 1 is a front elevation of a self-illuminated attitude indicator in accordance with the present invention.
Figure 2:
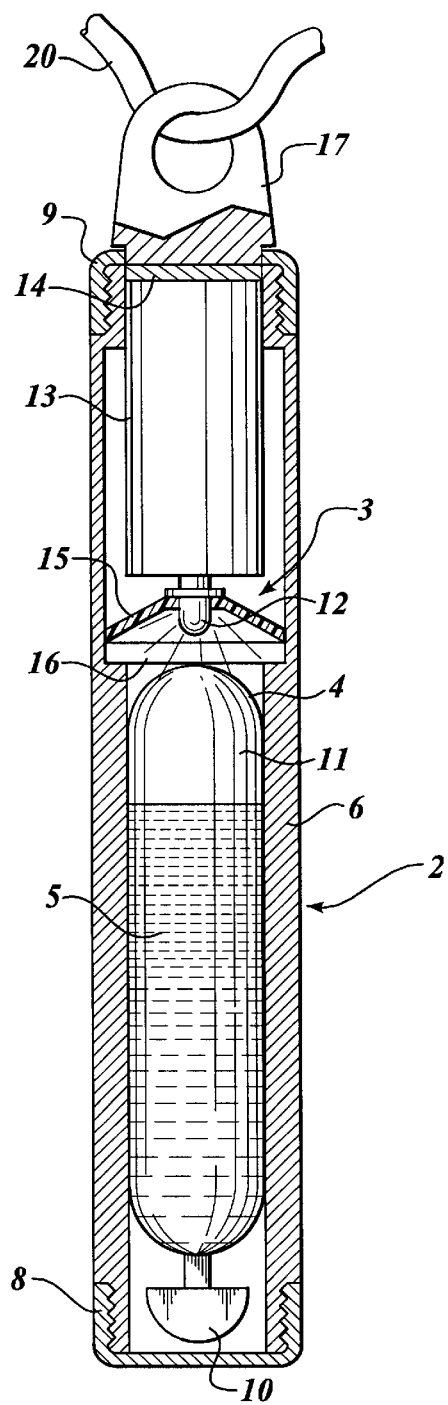
FIG. 2 is a front elevation corresponding to FIG. 1, but with parts shown in section.
Figure 3:
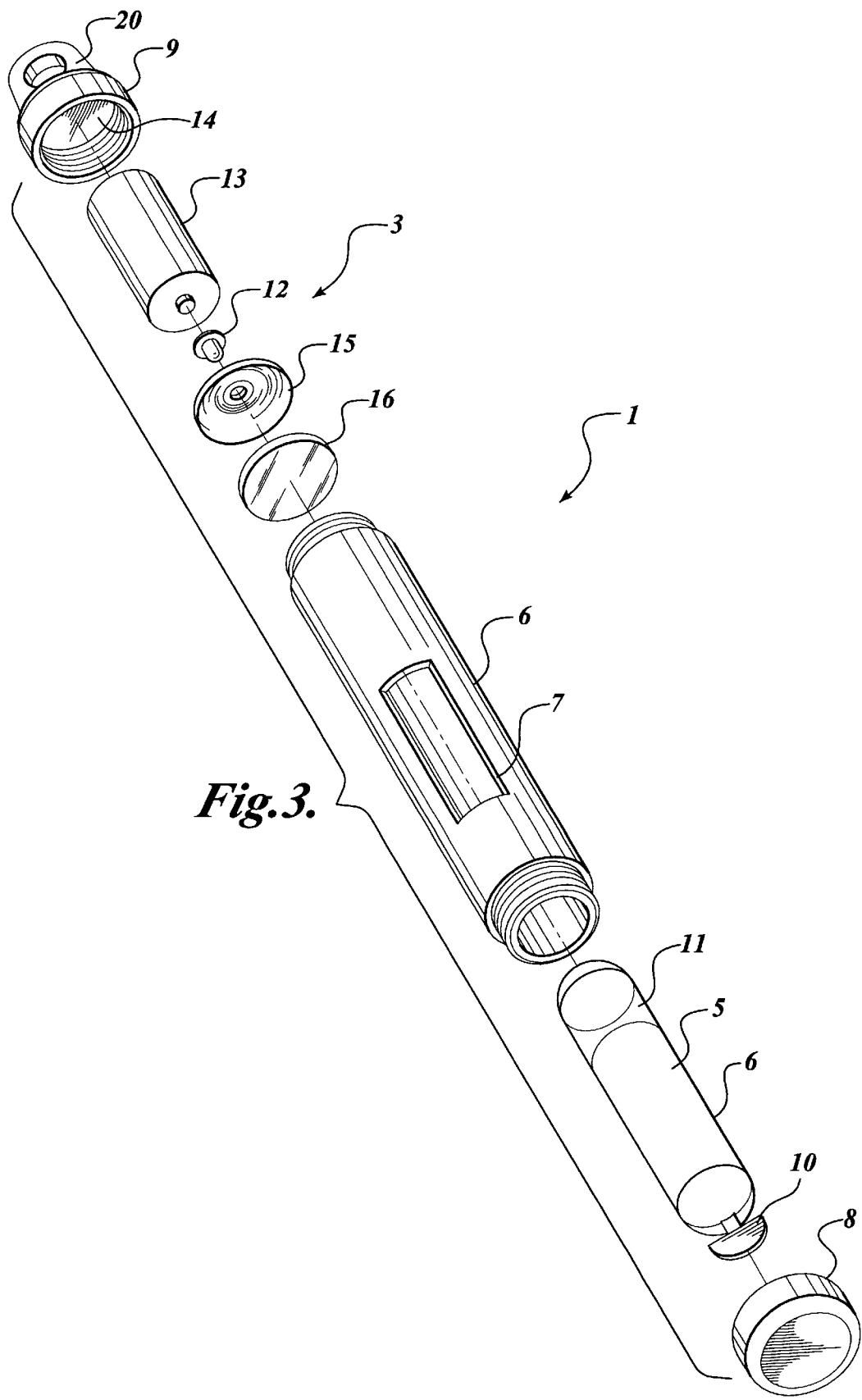
FIG. 3 is a bottom front perspective of the self-illuminated attitude indicator of FIG. 1 with parts shown in exploded relationship.

Referring to FIGS. 1–3, one embodiment of a self-illuminated attitude indicator 1 in accordance with the present invention has a casing 2 containing a light assembly 3 and a container 4 partially filled with a colored liquid 5. When activated, the light assembly 3 illuminates the liquid container 4 and the colored liquid 5 for viewing through an opening or window 7, as described more fully below.

Referring to FIGS. 2 and 3, the casing 2 is an elongated, substantially tubular shell 6 of any rigid material such as metal, plastic, or other materials known to those skilled in the art. The opening or window 7 is provided on one side of the shell 6, so that part of the liquid container 4 may be viewed within the casing. The casing 2 includes a bottom end cap 8, threadably attached to the tubular shell 6, and a top end cap 9 threadably attached to the opposite end of the shell 6. In another embodiment, the casing 2 is a unitary structure. In alternative embodiments, the tubular shell 6 and/or end cap 8 are textured or grooved in a checkered pattern for aiding users in gripping the shell and end cap.

The liquid container 4 can be formed of any translucent material, preferably shock resistant plastic, and it is preferably in the form of a flexible tube. It will be obvious to one skilled in the art that the liquid container 4 may be made of other materials, however, it must still be possible to view the liquid within the container. Liquid container 4 is preferably sized such that it is snugly fit within the shell 6 without excessive movement. In the embodiment shown, the liquid container 4 is configured with a cap 10 at the bottom. The cap can be broken off to release the colored liquid 5. In another embodiment, the top of liquid container 4 opposite the cap 10 is crimped closed.

The colored liquid 5 partially fills the liquid container 4, leaving an air bubble 11. Referring to FIG. 1, the window 7 the casing 2 is large enough and positioned so that the colored liquid 5 and the air bubble 11 may be observed when the self-illuminating attitude indicator is upright, thereby indicating the upward direction.

The colored liquid 5 is preferably resistant to freezing at the majority of temperatures known to naturally occur on the surface of the earth. An example of such a colored liquid 5 is a mixture of 70% isopropyl alcohol and 30% food coloring. The colored liquid 5 should also be of such a viscosity that it reacts to adjustments in the position of the apparatus at these temperatures. In one embodiment of the invention, the colored liquid 5 reacts very quickly to adjustments in the position of the apparatus. In another embodiment of the invention, the colored liquid 5 is of such a viscosity that it may be squirted from the liquid container 4 at these various temperatures.

The light assembly 3 includes a light-emitting diode 12, a battery 13, and a switch 14. The light-emitting diode 12 is held in place by a reflector 15 and covered at the bottom by a lens 16. In other embodiments the light source may be any small, durable light source, and may be positioned anywhere it illuminates the liquid container 4. The light-emitting diode 12, the battery 13, and the switch 14 are all in electrical communication with one another as would be known by one of ordinary skill in the art. In the embodiment shown, the switch 14 is a normally open, momentary push button switch that remains closed as long as pressure is applied. The switch 14 protrudes from the top end cap 9 and includes a small padeye 17. In other embodiments the switch may be any manually activated switch and may be located anywhere on the self-illuminated attitude indicator. Padeye 17 permits the self-illuminating attitude indicator to be attached to one's clothing by any known means for attaching items to clothing, such as string, wire, safety pins, etc. In another embodiment, the small padeye is omitted.

Figure 4:
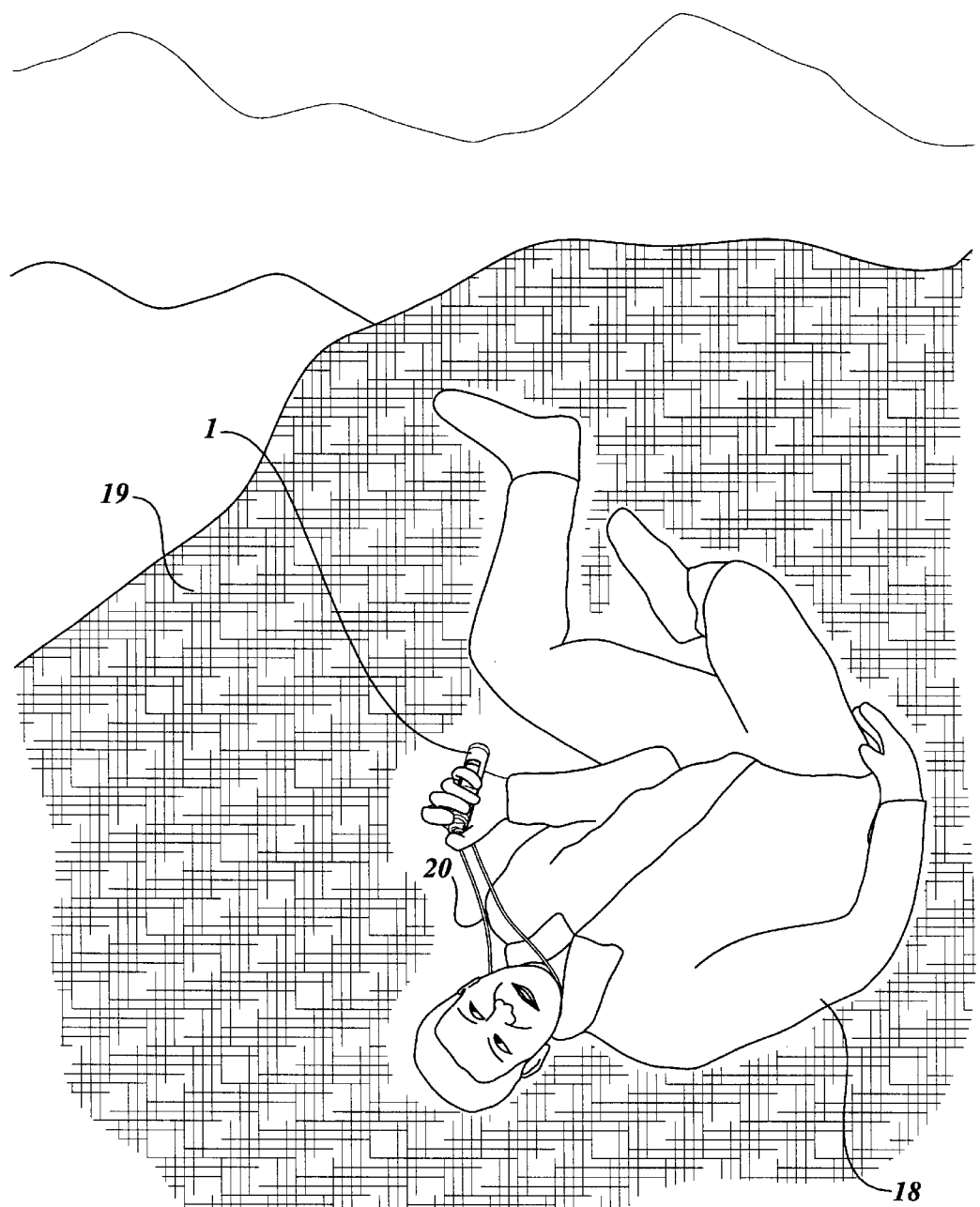
FIG. 4 is an illustration of a person buried in the snow using the self-illuminated attitude indicator of FIG. 1.

The illustrative embodiment, as described above, is ideally suited for use by persons buried in snow or mud. Such persons are often disoriented and unable to determine the direction of the surface. Referring to FIG. 4, the buried person 18 is completely surrounded by snow 19 and is grasping the self-illuminated attitude indicator 1. There is not any natural illumination to aid the buried person 18 in determining his orientation. The self-illuminating attitude indicator 1 has been worn on the lanyard 20 around the buried person's neck. The buried person 18 grips the self-illuminating attitude indicator 1, illuminates the colored liquid 5 by switching on the light-emitting diode 12 and, by observing the position of the colored liquid 5 and the air bubble 11 within the liquid container 4, positions the self-illuminating attitude indicator 1 so that it is oriented vertically, thereby indicating the direction he or she should dig. When the self-illuminating attitude indicator 1 has been properly positioned to indicate the up direction, the colored liquid 5 collects at the bottom of the liquid container 4 and the air bubble 11 is forced to the top.

In the illustrated embodiment, once the buried person 18 has dug free of the snow, if it were helpful the end cap 8 can be detached, the liquid container 4 removed from the casing 2, the liquid container cap 10 can be opened and, by application of pressure to the liquid container 4, the colored liquid 5 distributed on the snow to make the location more visible to rescuers.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of assisting in the rescue of oneself from having been completely buried in snow or earth, the method comprising:

illuminating and viewing the liquid and bubble in a translucent, partially full container of liquid;

orienting the container so that the bubble indicates the up direction;

digging in the up direction so indicated until reaching the surface; and distributing the liquid onto the surrounding snow or earth upon reaching the surface.

* * * * *